United States Patent
Buehler (10) Patent No.: US 8,245,894 B2
(45) Date of Patent: Aug. 21, 2012

(54) CUP HOLDER FOR SHOPPING CARTS THAT RETRACTS INTO THE BASKET OF THE SHOPPING CART

(76) Inventor: Alyson M. Buehler, Denver, CO (US)

(*) Notice: Subject to any disclaimer, the term of this patent is extended or adjusted under 35 U.S.C. 154(b) by 665 days.

(21) Appl. No.: 12/406,768

(22) Filed: Mar. 18, 2009

(65) Prior Publication Data
US 2009/0236381 A1   Sep. 24, 2009

Related U.S. Application Data

(60) Provisional application No. 61/038,024, filed on Mar. 19, 2008.

(51) Int. Cl.
*B62B 3/02* (2006.01)
*B62B 5/00* (2006.01)

(52) U.S. Cl. ........ 224/411; 224/282; 224/553; 224/926; 248/311.2

(58) Field of Classification Search ............ 224/411, 224/148.4, 148.7, 282, 926, 548, 553, 549, 224/555, 565; 280/47.34, 33.992; 248/311.2
See application file for complete search history.

(56) References Cited

U.S. PATENT DOCUMENTS

| | | | |
|---|---|---|---|
| 2,601,571 A | 6/1952 | Sverkerson | |
| 2,649,270 A * | 8/1953 | Franks | 248/311.2 |
| 3,912,291 A | 10/1975 | Frisch | |
| 4,356,651 A | 11/1982 | Barlow | |
| 4,434,961 A * | 3/1984 | Hoye | 248/311.2 |
| 4,685,701 A | 8/1987 | Amundson et al. | |
| 5,002,215 A | 3/1991 | Gregoire | |
| 5,271,634 A | 12/1993 | Walton | |
| 5,328,143 A * | 7/1994 | Koorey et al. | 248/311.2 |
| 5,342,009 A * | 8/1994 | Lehner | 248/311.2 |
| 5,362,077 A | 11/1994 | Adamson | |
| 5,464,183 A | 11/1995 | McConnell et al. | |
| 5,494,306 A | 2/1996 | Adamson et al. | |
| 5,597,104 A | 1/1997 | Elliott | |
| 5,678,888 A | 10/1997 | Sowell et al. | |
| 5,715,571 A | 2/1998 | Fasano | |

(Continued)

FOREIGN PATENT DOCUMENTS

JP   10-044855   2/1998
(Continued)

OTHER PUBLICATIONS

Notification of Transmittal of the international Search Report and the Written Opinion of the International Searching Authority, or the Declaration (PCT/US09/37560) mailed Sep. 25, 2009.

*Primary Examiner* — Justin Larson
*Assistant Examiner* — Corey Skurdal
(74) *Attorney, Agent, or Firm* — Holland & Hart LLP (57) ABSTRACT

A collapsible cup holder is provided. The collapsible cup holder is adapted to be coupled to a shopping cart and is rotatable between a retracted and deployed configuration. The cup holder includes a back with a top portion and a bottom portion. A top ring is rotatably coupled to the top portion and a base is rotatably coupled to the bottom portion. A strut extends between the top ring and the base and is rotatably coupled to both such that rotation of either the top ring or the base causes corresponding rotation of the other.

19 Claims, 11 Drawing Sheets

U.S. PATENT DOCUMENTS

| | | | |
|---|---|---|---|
| 5,938,091 A * | 8/1999 | Bergin et al. | 224/411 |
| 6,045,017 A * | 4/2000 | Connell | 224/148.7 |
| 6,056,178 A | 5/2000 | Rapp-Duncan | |
| 6,116,434 A | 9/2000 | Park | |
| 6,186,382 B1 | 2/2001 | Bergin et al. | |
| 6,427,960 B1 * | 8/2002 | Gehring et al. | 248/311.2 |
| 6,435,359 B1 | 8/2002 | Priminano | |
| 6,644,524 B1 | 11/2003 | Garvin | |
| 6,655,563 B2 * | 12/2003 | Shimajiri | 224/282 |
| 6,749,204 B2 | 6/2004 | Werner | |
| 6,766,931 B2 | 7/2004 | Wolf | |
| 6,966,566 B2 | 11/2005 | Duchene et al. | |
| 7,017,922 B2 | 3/2006 | Hartenstine et al. | |
| 7,134,674 B2 | 11/2006 | Frommherz | |
| 7,219,901 B2 | 5/2007 | Ryan | |
| 2002/0148868 A1 | 10/2002 | Dion-Bildstein et al. | |
| 2003/0052464 A1 | 3/2003 | McGuire | |
| 2003/0132590 A1 | 7/2003 | Werner | |
| 2004/0129852 A1 | 7/2004 | Giampavolo | |
| 2005/0199667 A1 | 9/2005 | Cappellino et al. | |
| 2005/0212235 A1 | 9/2005 | Hammerling | |
| 2007/0029745 A1 | 2/2007 | Ursettie | |

FOREIGN PATENT DOCUMENTS

| | | |
|---|---|---|
| JP | 2861801 | 2/1999 |
| JP | 2001-029201 | 2/2001 |
| KR | 10-2004-0048024 | 6/2004 |

* cited by examiner

CUP HOLDER FOR SHOPPING CARTS THAT RETRACTS INTO THE BASKET OF THE SHOPPING CART

CLAIM OF PRIORITY UNDER 35 U.S.C. §119

The present Application for Patent claims priority to U.S. Provisional Patent Application Ser. No. 61/038,024, titled "Cup Holder for Shopping Carts that Retracts into the Basket of the Shopping Cart, filed Mar. 19, 2008, and hereby expressly incorporated by reference herein.

CLAIM OF PRIORITY UNDER 35 U.S.C. §120

None.

REFERENCE TO CO-PENDING APPLICATIONS FOR PATENT

None.

BACKGROUND

1. Field

The technology of the present application relates generally to a collapsible holder for a beverage, and more specifically, to a collapsible cup holder attachable to the basket of a shopping cart.

2. Background

A trend currently exists for retail shopping stores to provide beverage services, such as, for example, STARBUCKS®, or beverages dispensing machines, such as Coke-a-Cola®, Pepsi®, bottled water or the like, for shoppers. Retailers provide these beverage services in an attempt to facilitate the needs of a shopper or consumer to make shopping more convenient and pleasurable for the shopper.

Most retailers also provide shopping carts for the convenience of the shoppers. Unfortunately, operating a shopping cart and consuming a beverage can be challenging. With conventional shopping carts, a customer must continuously hold the beverage or, in the alternative, rest the beverage on a portion of the shopping cart that is not designed to hold a beverage. Holding the beverage is an inconvenience at best. Moreover, the shopper may misplace the beverage, lose the beverage, or have the beverage spilled. Resting the beverage on a portion of the shopping cart that is not designed to hold a beverage is equally inconvenient. Often the beverage must be propped up by a article to be purchased or carried by the shopper. In many cases, the beverage tips causing a spill. This may cause damage to the shopper's goods and/or damage to items to be purchased, e.g., shrink.

Prior attempts to provide a device to hold a beverage have not satisfactorily addressed the above problem. Often the prior devices attach a holder to a shopping cart in a location remote from where the shopper generally stands relative to the cart. This tends to result in shoppers not using the device. Alternatively, the devices extend into basket of the shopping cart or in the foldable child restraint section of the cart. This reduces the storage space in the shopping cart when the holder is unnecessary.

Thus, against this background, it would be desirable to provide an improved device capable of holding a beverage configured for use with a shopping cart.

SUMMARY

Embodiments disclosed herein address the above stated needs by providing a cup holder. The cup holder is adapted to be coupled to a shopping cart and is deployable and retractable. The cup holder having a back with a top portion and a bottom portion. At least one top axle is coupled to the top portion by a hook and at least one bottom axle is coupled to the bottom portion by at least one hook. The cup holder has a top ring with flanges attached to opposite terminal ends of the top ring. The flanges are rotatably coupled to the top axle such that the top ring can rotate with respect to the back from a deployed configuration to a retracted configuration. The cup holder also has a base. The base having a first end distal from the back and a second end proximate the back. The base includes a plank coupled to the second end and extending from the second end to rotatably couple to the bottom axle, such that the base can rotate with respect to the back from a deployed configuration to a retracted configuration. The top ring and base are connected by a strut extending between the top ring and the base and being rotatably coupled to both the top ring and the base, such that moving either of the top ring or the base between the deployed configuration and the retracted configuration causes the other to be rotated between the deployed configuration and the retracted configuration.

Other embodiments of the present application include a shopping cart with a retractable and deployable cup holder. The shopping cart comprises an upper basket being formed by a plurality of horizontal and vertical wires. The shopping cart also has a retractable child seat that is rotatably coupled to the upper basket and being formed by a plurality of horizontal and vertical wires. A cup holder is coupled to the shopping cart and can be moved between a retracted and deployed state. The cup holder having a back with a top portion and a bottom portion. The back includes clasps to couple to corresponding horizontal or vertical wires. At least one top axle is coupled to the top portion by a hook and at least one bottom axle is coupled to the bottom portion by at least one hook. The cup holder has a top ring with flanges attached to opposite terminal ends of the top ring. The flanges are rotatably coupled to the top axle such that the top ring can rotate with respect to the back from a deployed configuration to a retracted configuration. The cup holder also has a base. The base having a first end distal from the back and a second end proximate the back. The base includes a plank coupled to the second end and extending from the second end to rotatably couple to the bottom axle, such that the base can rotate with respect to the back from a deployed configuration to a retracted configuration. The top ring and base are connected by a strut extending between the top ring and the base and being rotatably coupled to both the top ring and the base such that moving either of the top ring or the base between the deployed configuration and the retracted configuration causes the other to be rotated between the deployed configuration and the retracted configuration

BRIEF DESCRIPTION OF THE DRAWINGS

The accompanying drawings, which are incorporated in and constitute a part of this application, illustrate embodiments of the present invention, and together with the description, serve to explain the principles thereof. Like items in the drawings are referred to using the same reference number whenever possible.

DETAILED DESCRIPTION

The cup holder or beverage holder of the present application will now be described with particular reference to the drawings. While the cup holder or beverage holder is described with reference to a cup containing a beverage, one of ordinary skill in the art will now recognize on reading the disclosure that the cup holder or beverage holder may similarly hold a bottle, a jar, or other container as a matter of design choice. Moreover, although described in relation to liquids, the cup holder may be used for containers of fluids (liquids or gases) or solids, such as, for example, candy, treats, or the like. Moreover, the technology of the present application will be described with reference to the Figures and certain exemplary embodiments thereof. The word "exemplary" is used herein to mean "serving as an example, instance, or illustration." Any embodiment described herein as "exemplary" is not necessarily to be construed as preferred or advantageous over other embodiments.

Figure 1:
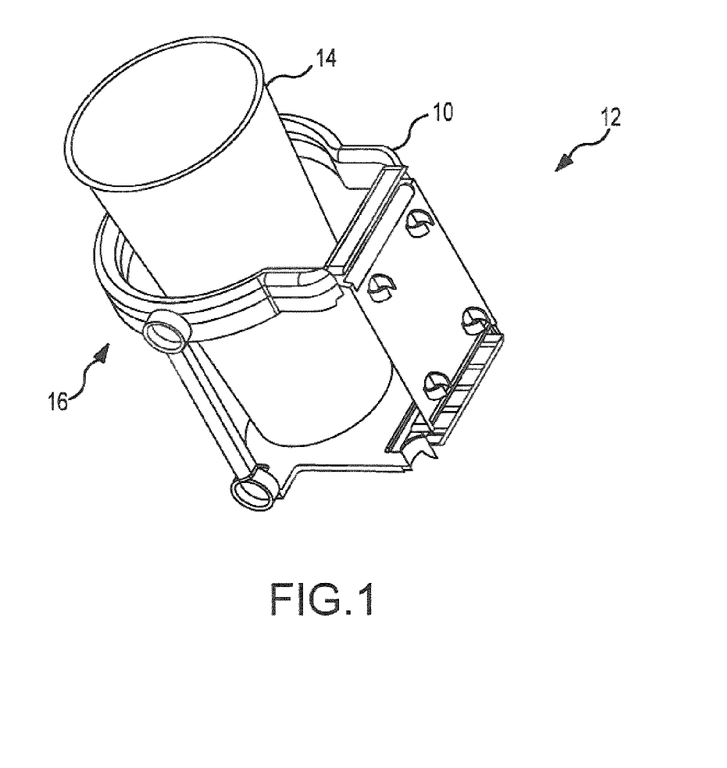
FIG. 1 is a top perspective view of a collapsible beverage holder in the deployed state with a cup.

Referring now to FIG. 1, a cup holder 10 is shown in a perspective view in a deployed configuration 12. The cup holder 10 is shown with a container 14 in a holding recess 16 formed by cup holder 10 as will be further explained below. In the deployed configuration 12, cup holder 10 holds or retains the container 14 to inhibit spilling from tipping or the like and/or misplacement of the container 14. The container 14 is shown as a cup, but could be any type of container including, for example, a bottle, a jar, a box, or the like. Moreover, while the holding recess 16 is shown to have a generally circular or, more broadly an elliptical configuration, the holding recess 16 will define a shape largely based on the type of container 14 that the holding recess 16 is designed to hold. Thus, as can be appreciated, the holding recess 16 may take several shapes including circular or elliptical as shown, square, rectangular, triangular, or any other polygonal or random shape. The cup holder 10 may be made out of numerous appropriate material, such as, for example, metals, metal alloys, composites, plastics, or the like. However, for manufacturing, it is envisioned that the cup holder 10 would be made from injection molded plastics or the like.

Figure 2:
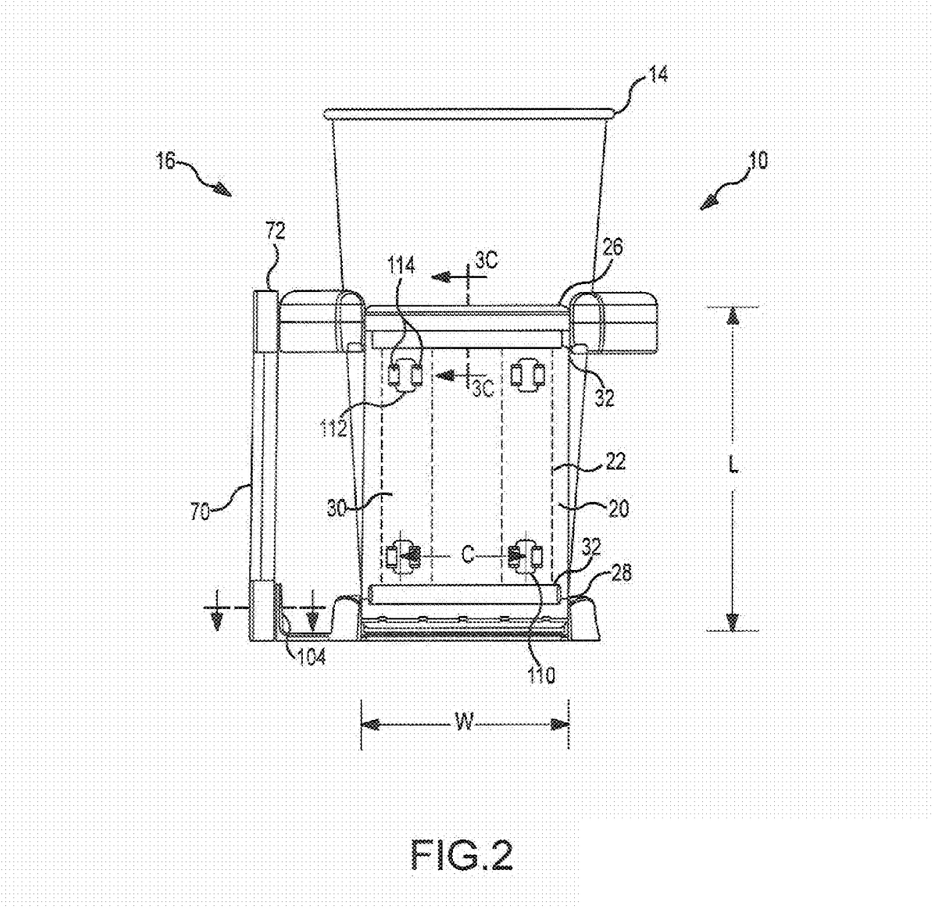
FIG. 2 is a rear elevation view of the cup holder of FIG. 1.
Figure 2A:
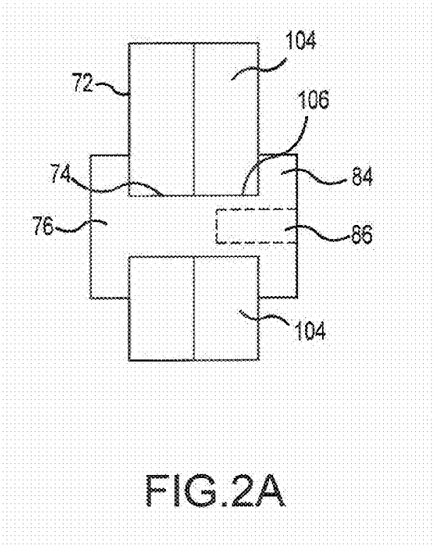
FIG. 2a is a cross-sectional view of a pivotal connection of the second head and tab of FIG. 2.

Referring now to FIG. 2, a rear elevation view of the cup holder 10 is provided. The container 14 also is shown. The cup holder 10 has a backing 20. Backing 20 has a length L and a width W. Backing 20 is shown as rectangular in shape, but could have other polygonal shapes, elliptical shapes, or even random shapes. Also, backing 20 may taper from the top to the bottom such that the width at the top and or bottom is different. Backing 20 has a first side 22 and a second side 24 (FIG. 3) opposite the first side 22. First side 22 faces away from the container 14. Backing 20 has a top portion 26 and a bottom portion 28 opposite top portion 26. As shown in phantom, backing 20 may comprise a frame 30 instead of a solid material.

Figure 3:
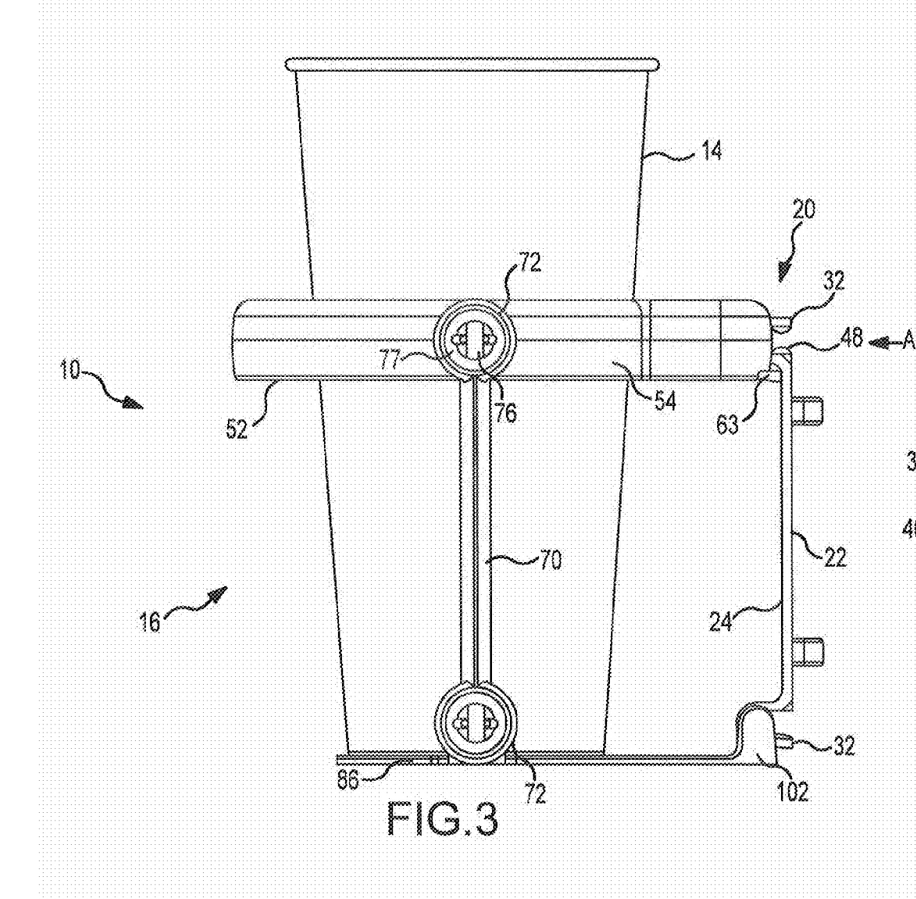
FIG. 3 is a left side elevation view of the cup holder of FIG. 1.
Figure 3C:
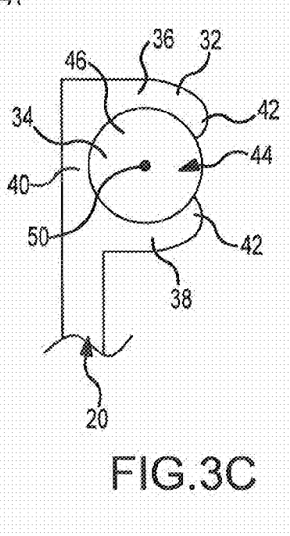
FIG. 3C is a cross-sectional view of a hook 32 of FIG. 3.

The top portion 26 and the bottom portion 28 have attached thereto hooks 32 as shown in FIGS. 2 and 3. The hooks 32, one of which is shown in cross-section in FIG. 3, provide a recess along the top portion 26 and bottom portion 28 through which an axle 34 or pivot rod 34 extends (see FIG. 34). The hooks 32, which are shown as elongated recesses may be one, two, three or more discrete hooks as a matter of design choice. The hooks 32 have a top surface 36, a bottom surface 38, and a side wall 40. Side wall 40 may be a continuous part of backing 20 or a separate piece coupled to backing 20. While described as surfaces for purposes of orientation, it should be apparent that hooks 32 may form a continuous C shape channel or a complete O shape such as a through hole, instead of a channel. As shown in FIG. 3C, the hooks 32 may have a C or sideways U shape. Moreover, the wall may be discrete straight walls, continuous curved walls, or a combination thereof. FIG. 3C shows a C shaped hook 32 in cross-section. As shown, C shaped hook 32 may have distal ends 42 that pinch towards each other to hold or form a recess 44 in which a pivot rod 46 or axle 46 may reside. In the case of a straight wall top surface 36 and bottom surface 38, protrusions 48 may exist at the distal ends 42 as shown in FIG. 3 to facilitate holding rod 46 in recess 44. Notice, as will be explained below, configuring distal ends 42 to pinch or have protrusions 48 may be optional depending on other mechanisms to hold rod 46 in recess 44.

Rod 46 may be oriented in recess 44 by sliding rod 46 down recess 44. Alternatively, rod 46 may slide into recess 44 by moving rod 46 into recess 44 in a sliding relation as shown by arrow A, in FIG. 3. When sliding rod 46 into recess 44, the distal ends 42 and/or protrusions 48 may be resilient or elastic to allow flexing of the hooks 32 to snap around rod 46. Once placed, rod 46 is in rotational and sliding relation to recess 44. The fit between rod 46 and recess 44 should allow for rotational movement of the rod 46 about a longitudinal axis 50 of rod 46. The fit between rod 46 and recess 44 may be sufficiently tight such that friction inhibits movement of rod 46 without application of some force, such as a person moving cup holder 10 from the retracted state to the deployed state.

Figure 7:
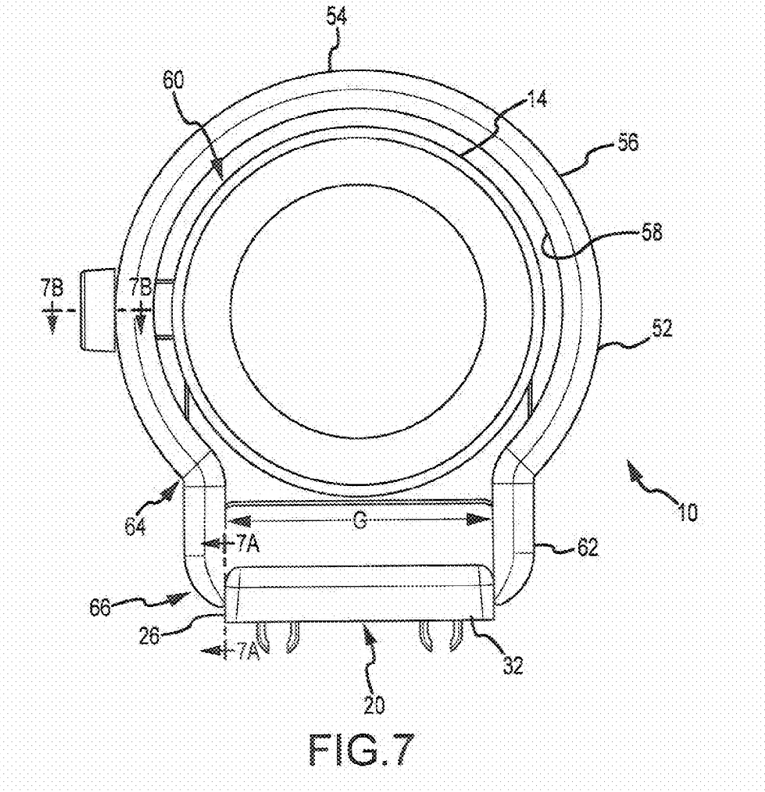
FIG. 7 is a top plan view of the cup holder of FIG. 1.

With reference to FIGS. 2, 3, and 7, extending from top portion 26 of backing 20 is a top ring 52. The top ring 52 is described and shown as a ring, but a ring should not be construed in a limiting sense to mean circular. Ring 52 should be shaped to conform to the container 14 which cup holder 10 is designed to hold. As shown for a generally cylindrical cup as container 14, top ring 52 is provided with a wall 54 having a continuously curved convex outer surface 56 and a continuously curved concave inner surface 58 forming a top recess 60 between top ring 52 and backing 20.

Figure 7A:
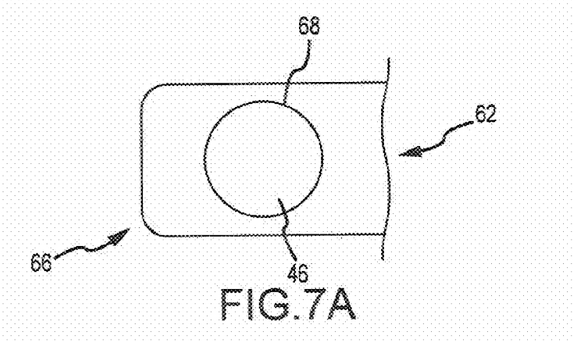
FIG. 7A is a cross-sectional view of the connection between a top ring and an axle of FIG. 7.

As shown best in FIG. 7, top ring 52 does not form a complete circle or ring, but terminates in fingers or flanges 62 extending from wall 54 to top portion 26 of backing 20. Fingers or flanges 62 are separated by a gap G, that is approximately equal to width W of backing 20 at top portion 26. Fingers 62 may be elastic such that in an un-stressed state, the distance between fingers 62 is less than gap G as shown such that the fingers 62 provide a compressive force to hold axle 46 as explained below. Fingers 62 have a proximate end 64 connected to wall 54 and a distal end 66 adjacent backing 20. As shown in FIG. 7A, distal end 66 has a cavity 68 into which axle 46 fits. The compressive force applies a frictional engagement between cavity 68 and axle 46. Axle 46 is in rotational engagement with cavity 68.

Figure 7B:
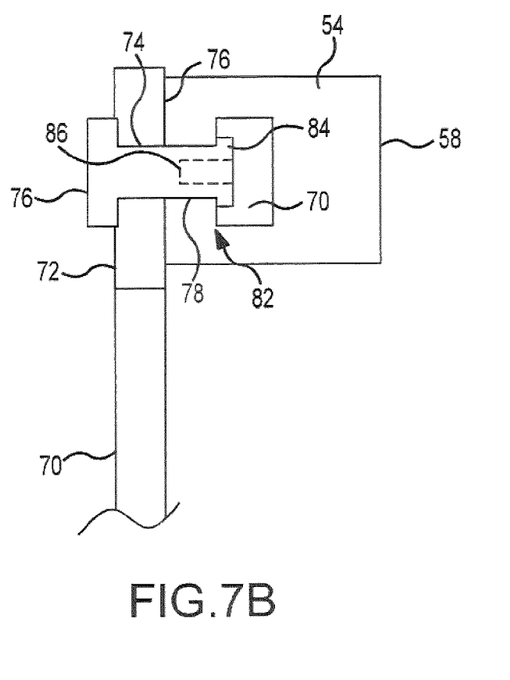
FIG. 7B is a cross-sectional view of the connection of the strut to the top ring of FIG. 7.

As shown best in FIGS. 2, 3 and 7B, a strut 70 extends from top ring 52 as will be further explained below. The strut 70 has a top head 72 with a bore 74. A fastener 76, such as, for example, a snap fitting, a set screw, a rivet, a pin, or the like extends through bore 74 into a bore 78 in top ring 52 (See FIG. 7B). Bore 78 may extend through wall 54 or terminate in a chamber 80 as shown. The distal end 82 of the fastener 76 may have a flanged surface 84 or protrusions to hold fastener 76 in bore 78. The fastener 76 acts as a pivot allowing strut 70 and top ring 52 to pivot relative to each other such that top ring 52 can be folded up relative to backing 20 into a retracted state or folded down relative to backing 20 into a deployed state. The strut 70 pivots relative to top ring 52, but generally moves with top ring 52 from the retracted to deployed state. It should be appreciated that the retracted state could also be entered by folding top ring 52 down relative to backing 20. The flanged surface 84 may be resilient to allow pushing fastener 76 through bores 74 and 78. Alternatively, one or more slots 86 in fastener 76 may allow compression of the distal end 82 such that the flanged surface can fit through the bores 74 and 78. Although only a single strut 70 is shown, it should be appreciated that additional pivoting struts 70 may be provided at additional locations as a matter of design choice.

Figure 4:
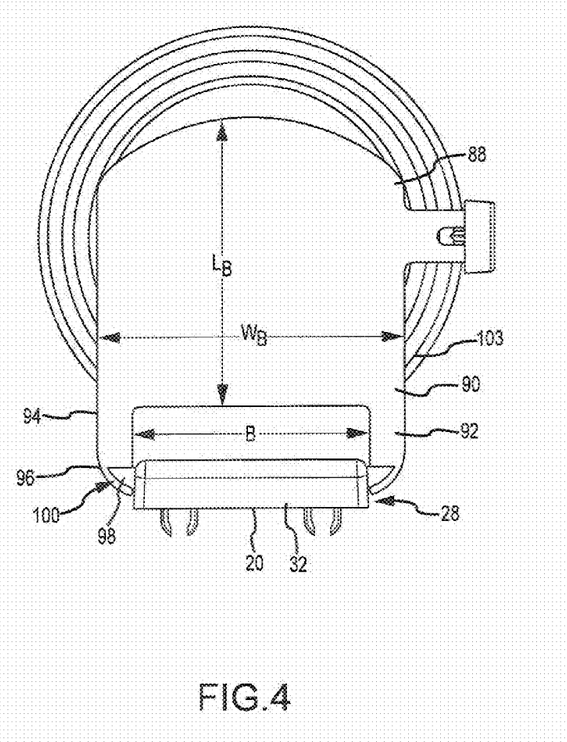
FIG. 4 is a bottom plan view of the cup holder of FIG. 1.
Figure 5:
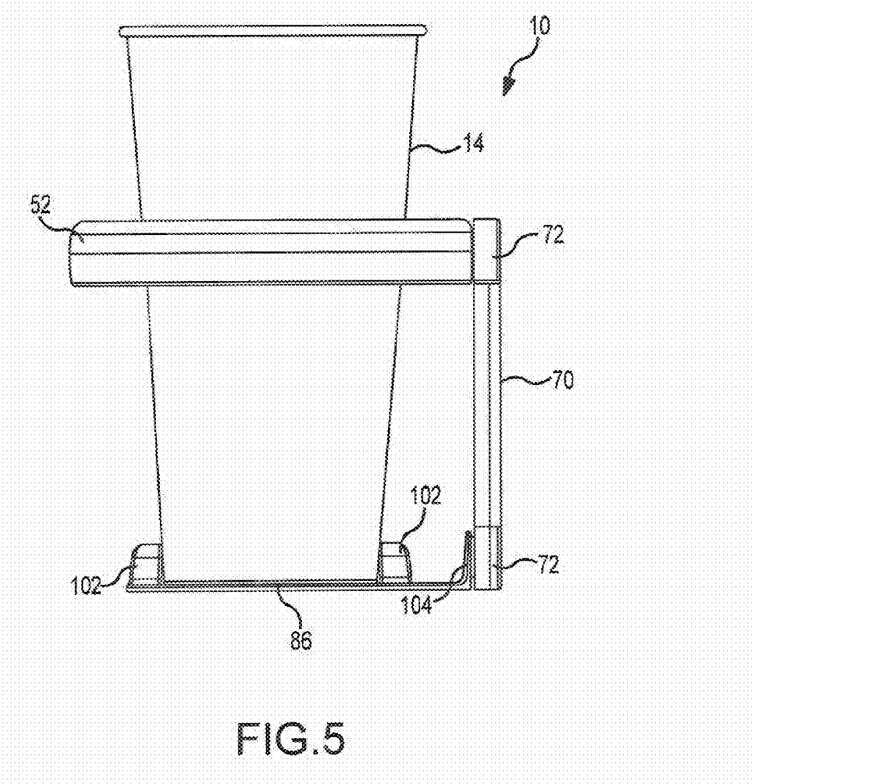
FIG. 5 is a right side elevation view of the cup holder of FIG. 1.
Figure 6:
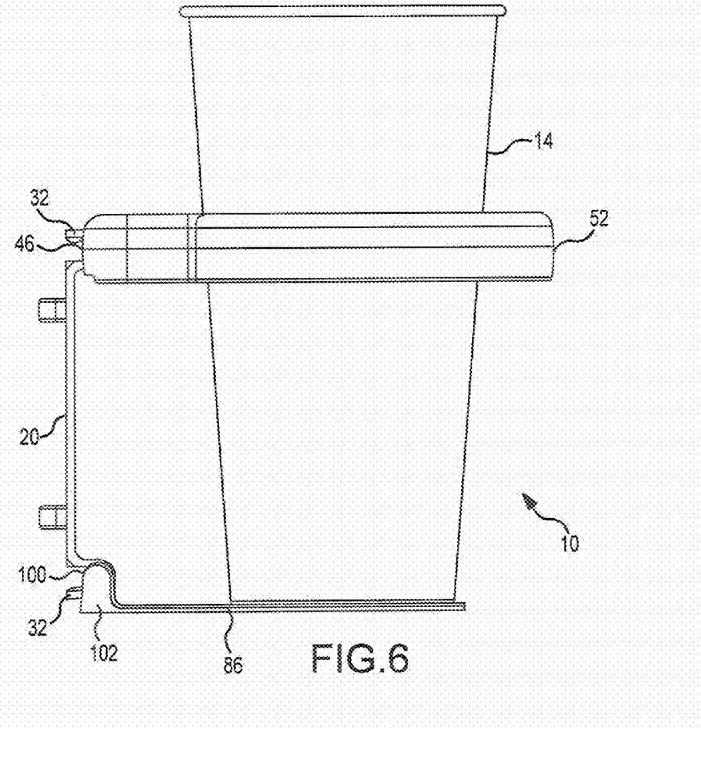
FIG. 6 is a front elevation view of the cup holder of FIG. 1.

Referring to FIGS. 3 and 4, the cup holder 10 has a base 86. The base 86 is generally configured to support container 14 and may be shaped accordingly. The base 86 has a length $L_B$ and a width $W_B$. Alternatively, the base 86 may, instead of having a length and width, have a diameter similar to the bottom of container 14 as shown. Still, alternatively, base 86 may have a petal-like arrangement, provide a number of separated planks in rows or columns, have a cross-hatched configuration or the like. Additionally, the base 86 may comprise a wire frame to support container 14. The, base 86 has a proximate end 90 oriented towards backing 20 and a distal end 88 opposite proximate end 90. The proximate end 90 may have fingers or flanges 62, similar to top ring 52, shown in FIG. 7, or planks 92 connected to proximate end 90 and extending toward backing 20. The planks 92 have a proximate end 94 connected to the proximate end 90 of the base 86 and a distal end 96 connected to axle 98. The axle 98 is similar to axle 46 described above. The axle 98 has a slot or groove 100 into which distal end 96 of the planks 92 fit. The planks 92 may be separated by a distance B. The planks 92 may be elastic such that the distance between planks 92 in an un-stressed state is less than the distance B such that the planks 92 place a compressive force on axle 100. The base 86 may have tabs 102 along portions of the edge 103 of the base 86. As shown in FIG. 3, two tabs 102 are provided to provide some cover to the connection between planks 92 and axle 100. A tab 104 (FIG. 2) is provide proximate strut 70.

As shown in FIG. 2, the strut 70 extends from top ring 52 to base 86. The strut 70 has a second head 72 proximate the base 86. Head 72 is coupled to tab 104 similar to connecting head 72 to top ring 52 with a few differences that are explained herein. The head 72 has a bore 74 though which a fastener 76 extends. Tab 104 has a bore 106 extending through the tab 104. Fastener 76 has a shaft that extends through both bores such that flanged surface 84 extends along tab 104 on a side of tab 104 opposite head 72.

The strut 70 provides multiple functions. First, strut 70 provides structural rigidity when cup holder 10 is holding a container 14. Second, the strut 70 transmits force applied to either the top ring 52 or the base 86 to fold or unfold the top ring and base relative to the backing 20 such that when either top ring 52 or the base 86 is moved in relation to backing 20, the force is transmitted through the strut 70 to cause the other of the base 86 or the top ring 52 to move in unison with the other.

Figure 8:
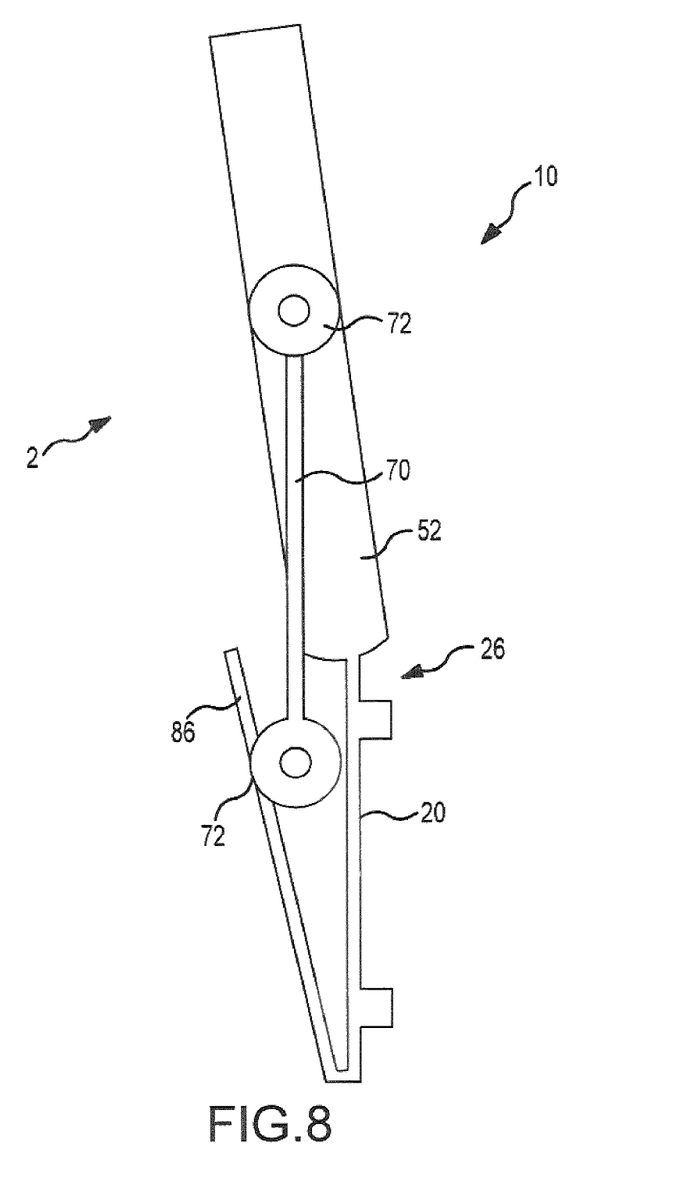
FIG. 8 is a side elevation view of a collapsible beverage holder in the retracted state.

Referring now to FIG. 8, the cup holder 10 is shown in the retracted configuration 2. As shown, the retracted configuration 2 is achieved by folding or rotating the top ring 52 and the base 86 towards the top portion 26 of backing 20. To achieve the deployed configuration 12, the top ring 52 and the base 86 are unfolded or away from the backing 20 to the deployed configuration as shown in FIG. 1. As can be appreciated, the retracted configuration 2 may similarly be with the top ring 52 and the base 86 folded or rotated towards the bottom portion 28.

Depending on whether cup holder 10 is designed to be retracted by folding the top ring 52 and the base 86 towards the top portion 26 or the bottom portion 28, a rotation inhibiter 77 may be provided in a number of locations to inhibit the rotation of the top ring 52 and the base 86. As shown, the rotation inhibiter 77 limits the rotation of fastener 76 in head 72 such that when in the deployed configuration 12, the cup holder will not fold or rotate towards the bottom portion 28 when a cup, bottle, or jar is placed in cup holder 10. Instead of associating the rotation inhibiter 77 with heads 72, the rotation inhibiter may be associated with hooks 32, axle 46 or 100, or the like, to limit rotation or folding of the top ring 52 and the base 86 towards the bottom portion 28 of backing 20. Alternatively, the friction of the various rotating/pivotal parts may be sufficient to hold the cup holder in either the retracted or deployed configuration as necessary. In still another configuration, a brace 63 may be provided (as shown in FIG. 3). The brace 63 may inhibit further rotation in either direction.

Figure 9:
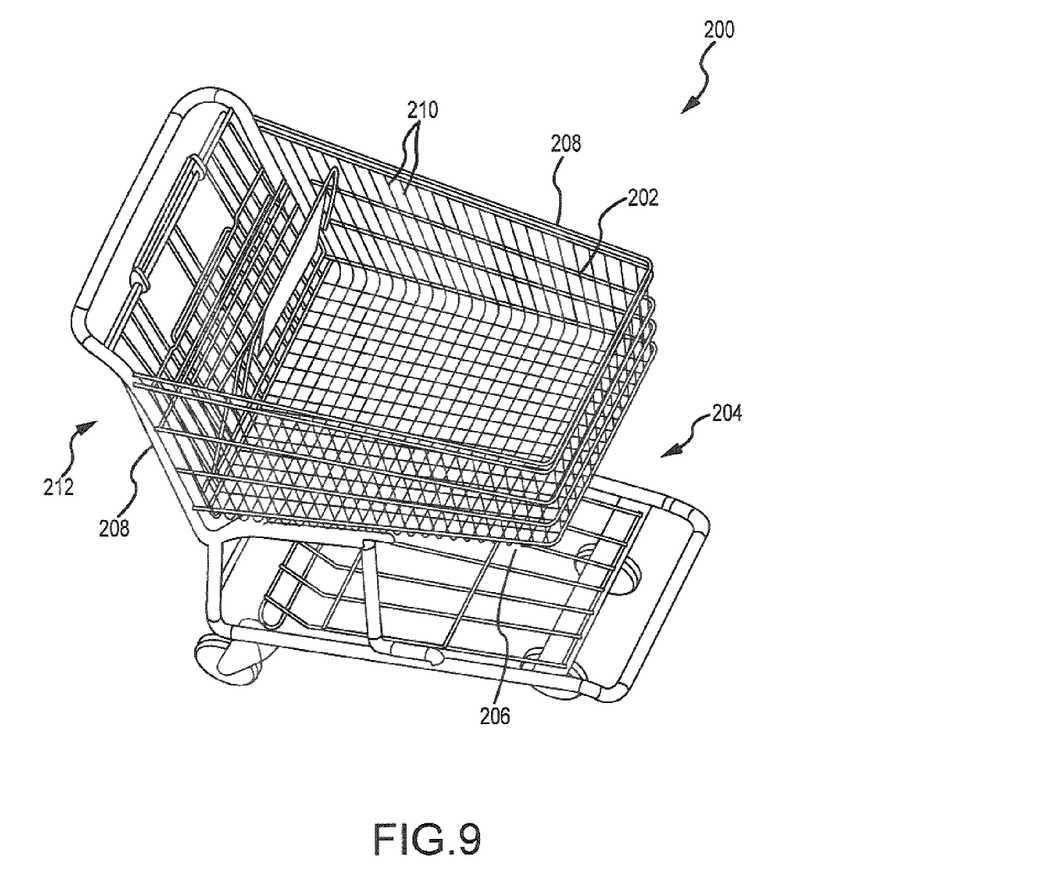
FIG. 9 is a perspective view of a conventional shopping cart.

Referring now to FIG. 9, a top perspective view of a conventional shopping cart 200 is provided. Shopping cart 200 includes an upper basket 202 and a lower cargo area 204. Upper basket 202 is typically designed with a horizontal bottom 206 and multiple vertical walls 208. The horizontal bottom 206 and vertical walls 208 may be constructed from vertical and horizontal wires 210. The upper basket 202 also may comprise a retractable child seat 212. The child seat 212 is typically pivotally connected to one of the vertical walls 208 of the upper based 202 to allow the retractable child seat 212 to have a deployed state as shown or a retracted state where the retractable child seat 212 is retracted to be substantially parallel with and adjacent the vertical wall 208 of the upper basket 202.

Referring now to FIG. 2, it will be seen that backing 20 has arranged on it four clasps 110. The clasps 110 are separated by a distance C such that the clasps are alignable with the vertical wires 210 to removably connect the cup holder to the shopping cart 200. The clasps 110 have attached to backing 20 at connection 112. Extending from connection 112 are at least two deformable or elastic prongs 114. Elastic prongs 114 for each clasp 110 are separated by a distance in the un-stressed state that is less than a diameter of the vertical wires 210 such that clasps 110 can be snapped on to any of the vertical wires 210 of shopping cart 200 such that cup holder 10 can be positioned as desired by the shopper. Moreover, because the cup holder 10 is retractable, a shopper without a beverage, cup, bottle, jar, or the like, can retract the cup holder without removing it and not have the cup holder be in an inconvenient location that obstructs or hinders shopping. Alternative clasps also may be used to connect the cup holder to the shopping cart. Also, instead of being removably coupled using clasps or the like to retrofit existing shopping carts, it would be possible to make the cup holder 10 as an integrated part of the shopping cart 200. Alternatively to having clasps 110 aligned to clasp with the vertical wires 210, clasps 110 can be aligned to clasp with the horizontal wires 210 or a combination of vertical and horizontal wires 210.

Although it is envisioned that cup holder 10 will not be readily removable by a customer, the cup holder 10 may be provided in a store where shopping carts 200 are provided. Alternatively, a customer also may bring a cup holder 10 as a matter of choice. In any event, if a cup holder is not already on the shopping cart, the customer or store locates an appropriate position on the shopping cart for the cup holder 10. The clasps 110 are aligned with the vertical wires 210 and the cup holder 10 is snapped onto the vertical wires 210. The cup holder 10 is folded into the retracted or deployed configuration as a matter of choice by the customer to allow the cup holder 10 to hold a container 4. At the conclusion of use, the cup holder 10 may be removed from the shopping cart 200.

Although it is envisioned that cup holder 10 will not be readily removable by a customer, the customer may reposition the cup holder 10 as desired in some embodiments of the invention. In other embodiments, the cup holder 10 may be removably coupled but the clasps 110 apply a sufficient force to grasp wires 210 so that it is difficult for the cup holder 10 to be removed by a customer.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A deployable and retractable cup holder that is adapted to be coupled to a shopping cart, the cup holder comprising: a back having a top portion and a bottom portion; at least one top axle coupled to the top portion by a hook and at least one bottom axle coupled to the bottom portion by at least one hook, each axle having opposite ends; a top ring having at least two flanges attached to opposite terminal ends of the top ring, each flange rotatably coupled to the top axle such that the top ring can rotate with respect to the back from a deployed configuration to a retracted configuration; a base, the base having a first end distal from the back and a second end proximate the back, the base including at least one plank coupled the second end and extending from the second end to rotatably couple to the bottom axle, such that the base can rotate with respect to the back from a deployed configuration to a retracted configuration; and at least one strut, the at least one strut extending between the top ring and the base and being rotatably coupled to both the top ring and the base such that moving either of the top ring or the base between the deployed configuration and the retracted configuration causes the other to be rotated between the deployed configuration and the retracted configuration.

2. The cup holder of claim 1, wherein the top ring comprises a wall having a convex outer surface and a concave inner surface defining a holding recess adapted to hold a container.

3. The cup holder of claim 2, the back further comprises at least one clasp such that the cup holder is adapted to releasably couple to at least one wire of a shopping cart.

4. The cup holder of claim 2, wherein the base is selected from the group of bases consisting of a solid base or a wire frame base.

5. The cup holder of claim 1, further comprising a rotation inhibiter to inhibit the rotation of the top ring and the base.

6. The cup holder of claim 1, further comprising a brace to inhibit the rotation of the top ring and the base.

7. The cup holder of claim 1, wherein the back is a frame.

8. The cup holder of claim 1, wherein the at least one strut is rotatably coupled to the top ring by a fastener.

9. The cup holder of claim 8, wherein the fastener is selected from the group of fasteners consisting of: an axle, a pin, a rivet, or a screw.

10. The cup holder of claim 8, wherein the at least one strut is rotatably coupled to the base by a fastener coupled to a tab.

11. The cup holder of claim 10, wherein rotation of the top ring and the base is inhibited by the friction between the strut and the fastener coupled to at least one of the top ring or the base.

12. The cup holder of claim 1, wherein the at least one hook comprises pinched distal ends.

13. The cup holder of claim 1, wherein the at least one hook comprises at least one protrusion.

14. The cup holder of claim 1, wherein the each flange has a cavity, the top axle is rotatably coupled to the cavity of the flange.

15. The cup holder of claim 14, wherein rotation of the top ring is inhibited by the friction between the top axle and at least one of the cavity and the hook.

16. The cup holder of claim 1, wherein the bottom axle has at least one slot, the at least one plank is rotatably coupled to the axle by the slot.

17. The cup holder of claim 16, wherein rotation of the base is inhibited by the friction between the bottom axle and the hook.

18. A shopping cart, comprising: an upper basket, the basket being formed by a plurality of horizontal and vertical wires; a retractable child seat, the retractable child seat being rotatably coupled to the upper basket and being formed by a plurality of horizontal and vertical wires; and a deployable and retractable cup holder coupled to the shopping cart, the cup holder comprising: a back having a top portion and a bottom portion, the back comprising a plurality of clasps that couple to a corresponding plurality of the horizontal and vertical wires; at least one top axle coupled to the top portion by a hook and at least one bottom axle coupled to the bottom portion by at least one hook, each axle having opposite ends; a top ring having at least two flanges attached to opposite terminal ends of the top ring, each flange rotatably coupled to the top axle such that the top ring can rotate with respect to the back from a deployed configuration to a retracted configuration; a base, the base having a first end distal from the back and a second end proximate the back, the base including at least one plank coupled to the second end and extending from the second end to rotatably couple to the bottom axle, such that the base can rotate with respect to the back from a deployed configuration to a retracted configuration; and at least one strut, the at least one strut extending between the top ring and the base and being rotatably coupled to both the top ring and the base such that moving either of the top ring or the base between the deployed configuration and the retracted configuration causes the other to be rotated between the deployed configuration and the retracted configuration.

19. The shopping cart of claim 18 wherein the cup holder is releasably coupled to the shopping cart.

* * * * *